United States Patent
Huang et al.

(10) Patent No.: US 7,741,820 B2
(45) Date of Patent: *Jun. 22, 2010

(54) SWITCHING VOLTAGE REGULATOR PULSE WIDTH MODULATION CONTROLLER AND METHOD

(75) Inventors: Hsiang Lin Huang, Hsinchu (TW); Kent Huang, Hsinchu (TW); Mao Chuan Chien, Hsinchu (TW); Shun Hau Kao, Hsinchu (TW)

(73) Assignee: Advanced Analog Technology, Inc., Hsinchu (TW)

( * ) Notice: Subject to any disclaimer, the term of this patent is extended or adjusted under 35 U.S.C. 154(b) by 38 days.

This patent is subject to a terminal disclaimer.

(21) Appl. No.: 12/203,078

(22) Filed: Sep. 2, 2008

(65) Prior Publication Data

US 2009/0189585 A1 Jul. 30, 2009

(30) Foreign Application Priority Data

Jan. 25, 2008 (TW) ............................ 97102798 A

(51) Int. Cl.
G05F 1/59 (2006.01)
(52) U.S. Cl. .................. 323/271; 323/285; 323/351
(58) Field of Classification Search ............. 323/271, 323/282, 285, 351; 361/18; 363/41, 56.05, 363/56.08, 56.11, 97
See application file for complete search history.

(56) References Cited

U.S. PATENT DOCUMENTS

| 5,335,162 | A | * | 8/1994 | Martin-Lopez et al. | 363/97 |
| 5,532,626 | A | * | 7/1996 | Khayat | 327/53 |
| 6,297,623 | B1 | * | 10/2001 | Balakrishnan et al. | 323/283 |
| 7,064,531 | B1 | * | 6/2006 | Zinn | 323/268 |
| 7,233,131 | B2 | | 6/2007 | Lin et al. | |
| 7,336,060 | B2 | * | 2/2008 | Ito | 323/299 |
| 2009/0167274 | A1 | * | 7/2009 | Chien et al. | 323/285 |
| 2009/0189661 | A1 | * | 7/2009 | Kao et al. | 327/172 |
| 2009/0284238 | A1 | * | 11/2009 | Huynh et al. | 323/282 |

OTHER PUBLICATIONS

NCP1582, NCP1582A, NCP1583.

* cited by examiner

*Primary Examiner*—Jeffrey L Sterrett
(74) *Attorney, Agent, or Firm*—Winston Hsu

(57) ABSTRACT

A PWM controller for controlling a switching voltage regulator comprises a first comparator, a second comparator and a third comparator. The first comparator is configured to detect voltages of a first node and a second node so as to determine whether to stop the PWM controller. The PWM controller is stopped if a first potential is lower than a threshold, and the first potential derives from the voltage of the first node by a level shift of a first voltage difference. The second comparator is configured to detect the voltage of the first node and then to compare the voltage with a power reference voltage so as to determine whether the PWM controller receives necessary power. The third comparator is configured to compare the voltage of the second node with an enable reference voltage so as to determine whether to disable the PWN controller.

10 Claims, 5 Drawing Sheets

SWITCHING VOLTAGE REGULATOR PULSE WIDTH MODULATION CONTROLLER AND METHOD

BACKGROUND OF THE INVENTION

1. Field of the Invention

The present invention relates to a circuit design, and more particularly, to a circuit design of a pulse width modulation (PWM) controller and the application thereof.

2. Description of the Related Art

A PWM controller is widely used in a switching voltage regulator. FIG. 1 shows a hint diagram of a prior PWM controller that controls a switch voltage regulator 10. The PWM controller 18 provides a plurality of switch control signals to control the on/off states of a high side switch 12 and a low side switch 14. By the control of the on/off states, an input voltage $V_{in}$ can be transformed into a stable output voltage $V_{out}$.

FIG. 1 shows a prior switch voltage regulator 10, which includes a high side transistor 12 and a low side transistor 14 connected in series between an input voltage $V_{in}$ and a ground potential GND. The switch control signal includes a UGATE signal for controlling the on/off state of the high side transistor 12, an LGATE signal for controlling the on/off state of the low side transistor 14. The common node 110 of the high and low side transistors is coupled to an output stage 112, which includes a low-pass filter composed of a capacitor C and inductor L and a load circuit $R_L$, where the load circuit $R_L$ is driven by the output voltage $V_{out}$ of the switch voltage regulator 10.

Generally, the PWM controller 18 features multiple functions if implemented in a single chip, such as over-current protection, under voltage lockout (UVLO), and enable/disable control. The over-current protection is used to detect the current flowing through the high side transistor 12 or low side transistor 14. If the current is larger than an over-current threshold, the PWM controller is stopped so as to protect the components of the switch voltage regulator from being damaged by a large current. The UVLO function is to temporarily lock the PWM controller 18 if the input voltage $V_{in}$ is lower than a threshold. The consideration of the UVLO function is to reduce static power consumption and increase the reliability of the output voltage $V_{out}$. The function of the enable/disable signal is to activate and deactivate the operation of the PWM controller. In addition, a power-sensing function can be used to detect the input voltage $V_{in}$ of the switching voltage regulator. If the input voltage $V_{in}$ is greater than a threshold, the PWM controller is prepared for activation so as to shorten the time to boot the switching voltage regulator.

However, it is a general requirement to implement a powerful chip but at the same time limit the number of pins in a package. Therefore, to implement the above functions without increasing the number of pins is a major objective of PWM controller chip design.

SUMMARY OF THE INVENTION

The present invention proposes a PWM controller for controlling a switching voltage regulator, and the PWM controller comprises a first comparator, a second comparator and a third comparator. The first comparator is configured to detect voltages of a first node and a second node so as to determine when to stop the PWM controller. The PWM controller is stopped if a first potential is lower than a threshold, and the first potential derives from the voltage of the first node by a level shift of a first voltage difference. The second comparator is configured to detect the voltage of the first node and then to compare the voltage with a power reference voltage so as to determine whether the PWM controller receives necessary power. The third comparator is configured to compare the voltage of the second node with an enable reference voltage so as to determine when to disable the PWN controller.

The present invention proposes another PWM controller for controlling a switching voltage regulator. The PWM controller generates a lock and protection signal, a power-sensing signal and a disable signal based on the voltages of a first node and a second node, and is packaged with exactly eight pins. The eight pins includes a phase pin, an enable pin, a feedback pin, a power pin, a ground pin, a low side switch control pin, a voltage rising pin and a high side switch control pin. The phase pin is configured to capture the voltage of the first node. The enable pin is configured to capture the voltage of the second node. The feedback pin is configured to receive a feedback signal from the output of the switch voltage regulator. The power pin and ground pin are used to receive a supply voltage. The low side switch control pin is configured to output a low side switch control signal to control the low side switch, wherein the low side switch control signal is generated by reference to the voltages of the power pin, ground pin, feedback signal, lock and protection signal, power sensing signal and disable signal. The high side switch control pin is configured to output a high side switch control signal to control the high side switch, wherein the high side switch control signal is generated by reference to the voltages of the voltage rising pin, phase pin, feedback signal, lock and protection signal, power sensing signal and disable signal.

The proposed method for controlling a PWM controller comprises the steps of: capturing the voltages of a first node and a second node of a PWM controller; setting a first potential, wherein the first potential is a level shift derived from the voltage of the first node; stopping the operation of the PWM controller if the first potential is lower than the voltage of the second node; determining that the PWM controller has received necessary power if the first potential is higher than a power reference voltage; and disabling the PWM controller if the voltage of the second node is lower than an enable reference voltage.

BRIEF DESCRIPTION OF THE DRAWINGS

The invention will be described according to the appended drawings in which.

PREFERRED EMBODIMENT OF THE PRESENT INVENTION

Figure 1:
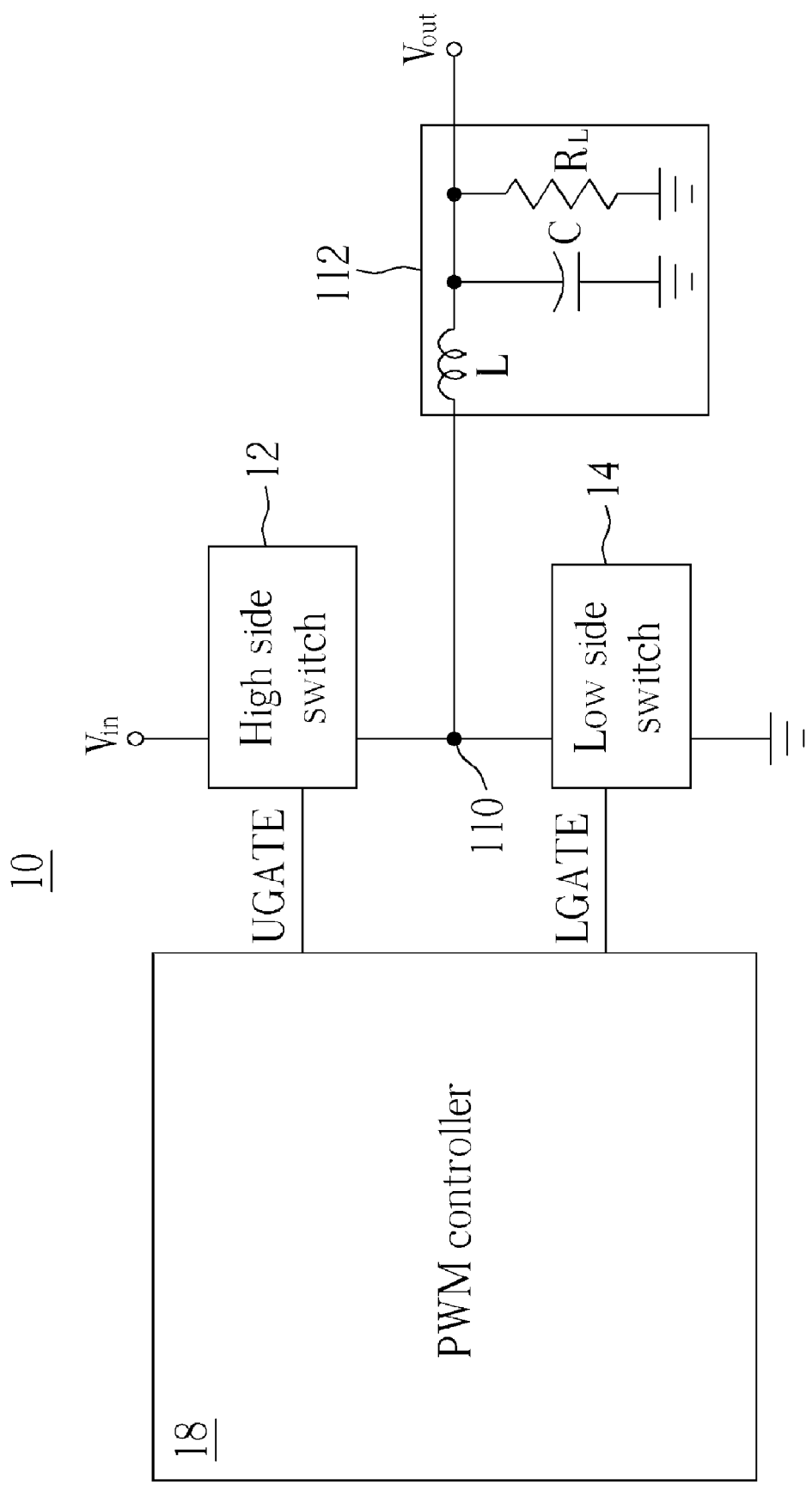
FIG. 1 shows a prior switch voltage regulator.
Figure 2:
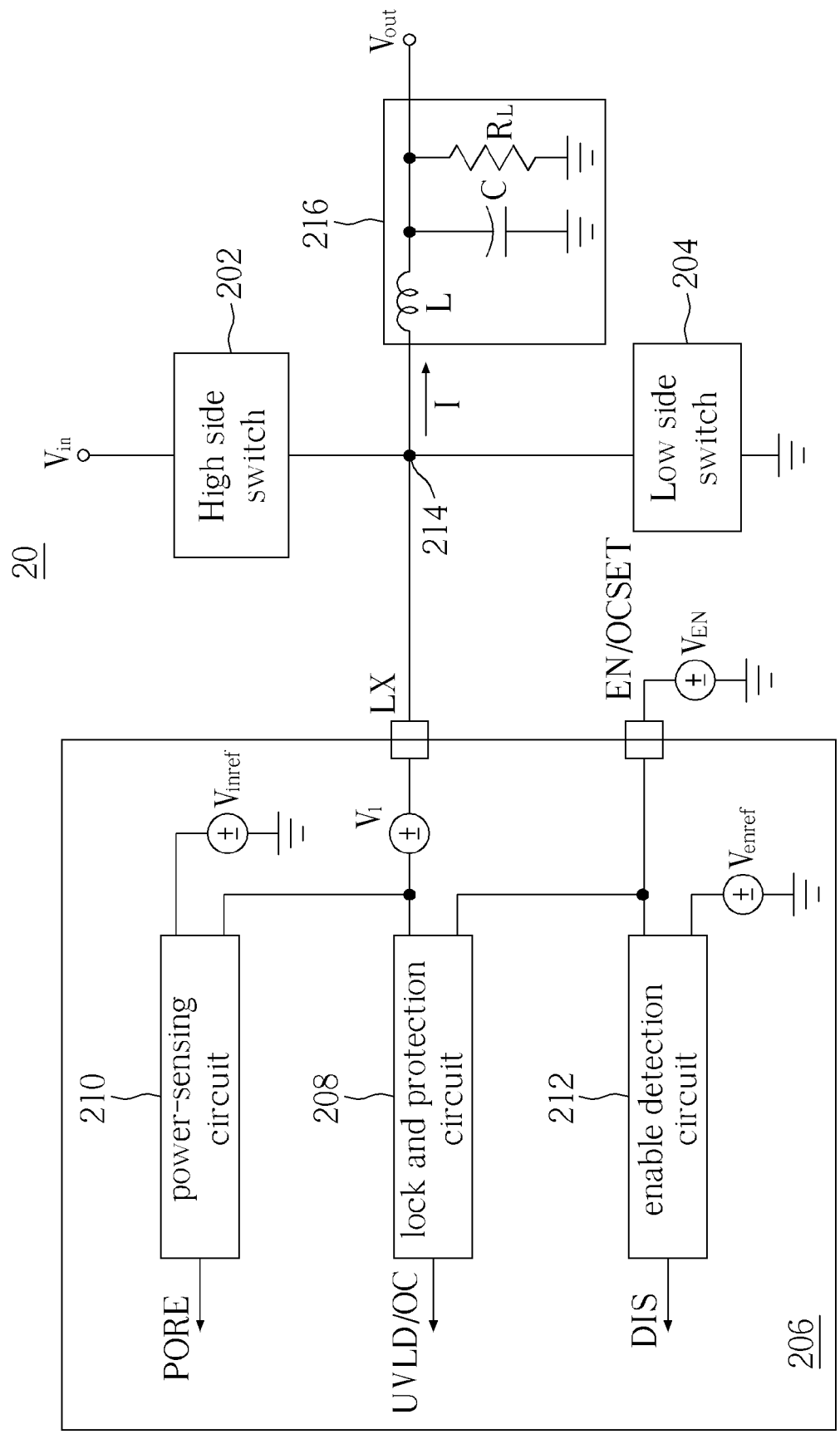
FIG. 2 shows a block diagram of the PWM controller according to one embodiment of the present invention.

FIG. 2 shows a block diagram of the PWM controller 206 according to one embodiment of the present invention. In the embodiment, the PWM controller 206 is capable of controlling a switch voltage regulator 20. The switch voltage regulator 20 includes a high side switch 202 and a low side switch 204 connected serially. The common node 214 of the high side switch 202 and the low side switch 204 is connected to an output stage 216. By switching the high side switch 202 and the low side switch 204 through the PWM controller 206, an input voltage $V_{in}$ can be transformed into a stable output voltage $V_{out}$.

One function of the lock and protection circuit 208 is under-voltage lockout (UVLO), which can be implemented by a first comparator. When the input voltage $V_{in}$ is too low for the internal elements of the PWM controller 206 to maintain normal operations, the UVLO function e activated to suspend the operations of the internal elements so as to avoid unpredictable results. In one embodiment of the present invention, the lock and protection circuit 208 detects the voltage $V_{LX}$ of the first node LX of the PWM controller and makes a level shift $V_1$ to form a first potential. If the first potential is lower than the voltage $V_{EN}$ of the second node EN/OCSET of the PWM controller 206, the lock and protection circuit 208 will send out a lock and protection signal UVLO/OC to stop the operation of the PWM controller 206. In other embodiments of the present invention, the level shift $V_1$ is determined by the current $I_1$ of the first current source and a first resistor $R_1$, that is, the current $I_1$ can flow in or flow out the first node LX, depending on the design of the circuit.

Figure 3:
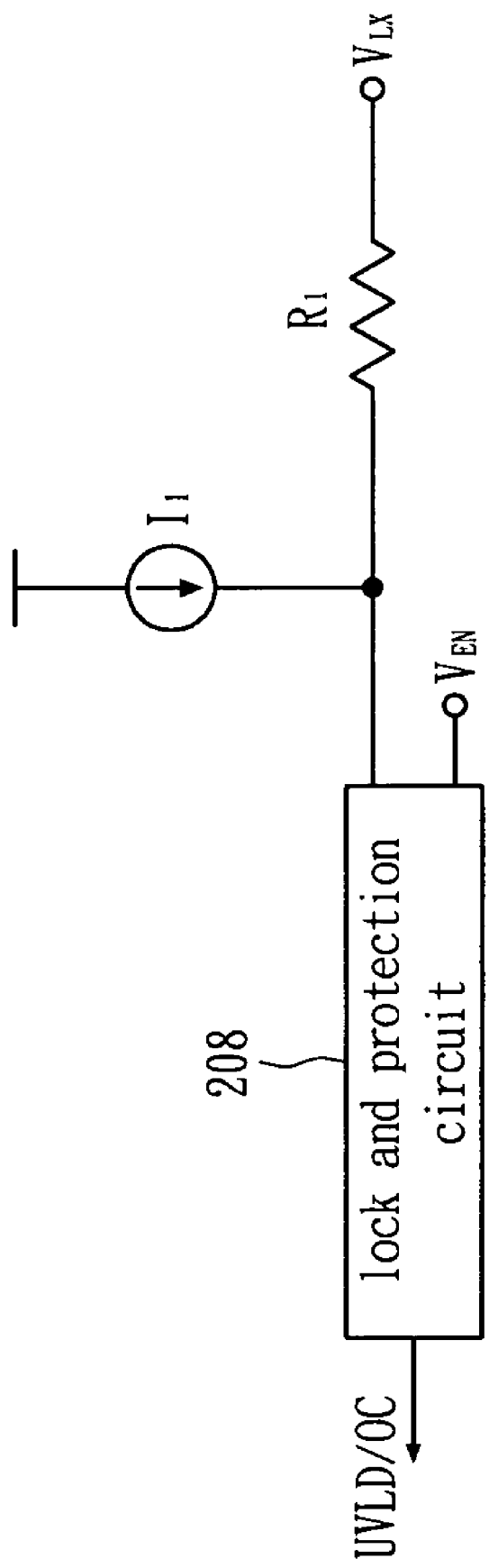
FIG. 3 shows a connection between the lock and protection circuit and other reference signals.
Figure 4:
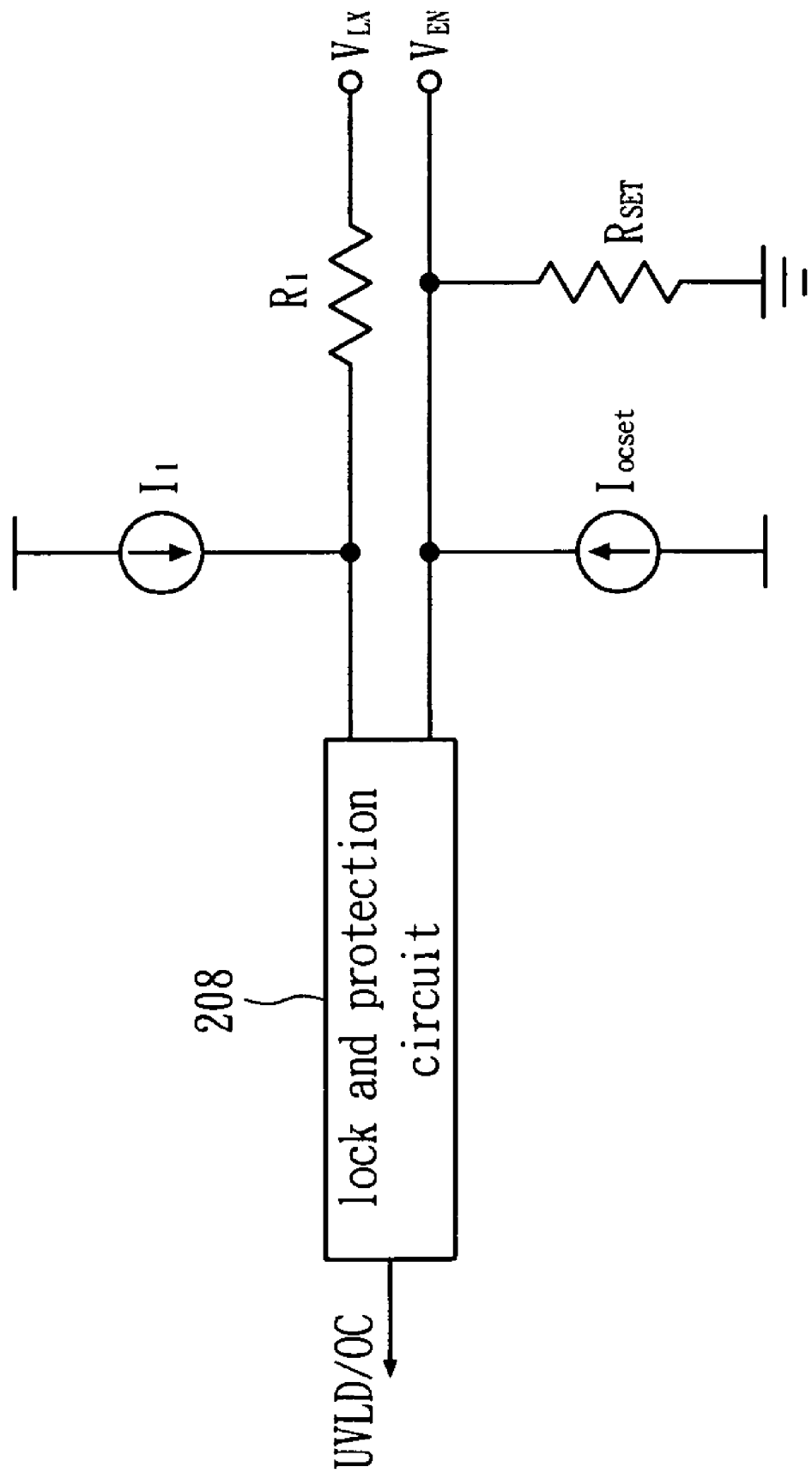
FIG. 4 shows a connection between the lock and protection circuit and other reference signals.

FIG. 3 shows a connection between the lock and protection circuit 208, the voltage $V_{LX}$ of the first node, the first current source $I_1$, the first resistor $R_1$ and the voltage $V_{EN}$ of the second node. In other embodiments of the present invention, the voltage $V_{EN}$ of the second node is determined by a second current source $I_{OSCET}$ and an over-current setting resistor $R_{SET}$. FIG. 4 shows the connection between the lock and protection circuit 208, the voltage $V_{LX}$ of the first node, the first current source $I_1$, the first resistor $R_1$, the second current source $I_{OSCET}$, the over-current setting resistor $R_{SET}$ and the voltage $V_{EN}$ of the second node.

The lock and protection circuit 208 has another function of over-current protection, which can be implemented by a second comparator. When the current of the high side switch 202 or low side switch 204 is too large, the lock and protection circuit 208 stops the operation of the PWM controller 206 to protect the high side switch 202 or low side switch 204 from damage by over current. The method of detecting over current is similar to the method of detecting under voltage lockout, that is, first capturing the voltage $V_{LX}$ of the first node of the PWM controller, and then making a level shift $V_1$ to form a first potential. If the first potential is smaller than the voltage $V_{EN}$ of the second node, the PWM controller is stopped.

The PWM controller 206 can include an enable detecting circuit 212, which can be implemented by a third comparator. The enable detecting circuit 212 is used to detect the voltage $V_{EN}$ of the second node of the PWM controller to activate or deactivate the PWM controller 206. In one embodiment of the present invention, the enable detecting circuit 212 compares the voltage $V_{EN}$ of the second node with an enable reference voltage $V_{enref}$. If the voltage $V_{EN}$ of the second node is smaller than the enable reference voltage $V_{enref}$, the enable detecting circuit 212 sends out a disable signal DIS to disable the PWM controller 206.

The present PWM controller 206 further includes a power sensing circuit 210, which compares the first potential with a power reference voltage $V_{inref}$. If the first potential is greater than the power reference voltage $V_{inref}$, the power sensing circuit 210 determines that the PWM controller 206 receives necessary power. In one embodiment of the present invention, when the enable detecting circuit 212 stops sending out the disable signal DIS, it does not mean that the internal components of the PWM controller have resumed work again. It is necessary to await the first potential greater than the power reference voltage $V_{inref}$. Meanwhile, the PWM controller is confirmed to receive the necessary power.

Figure 5:
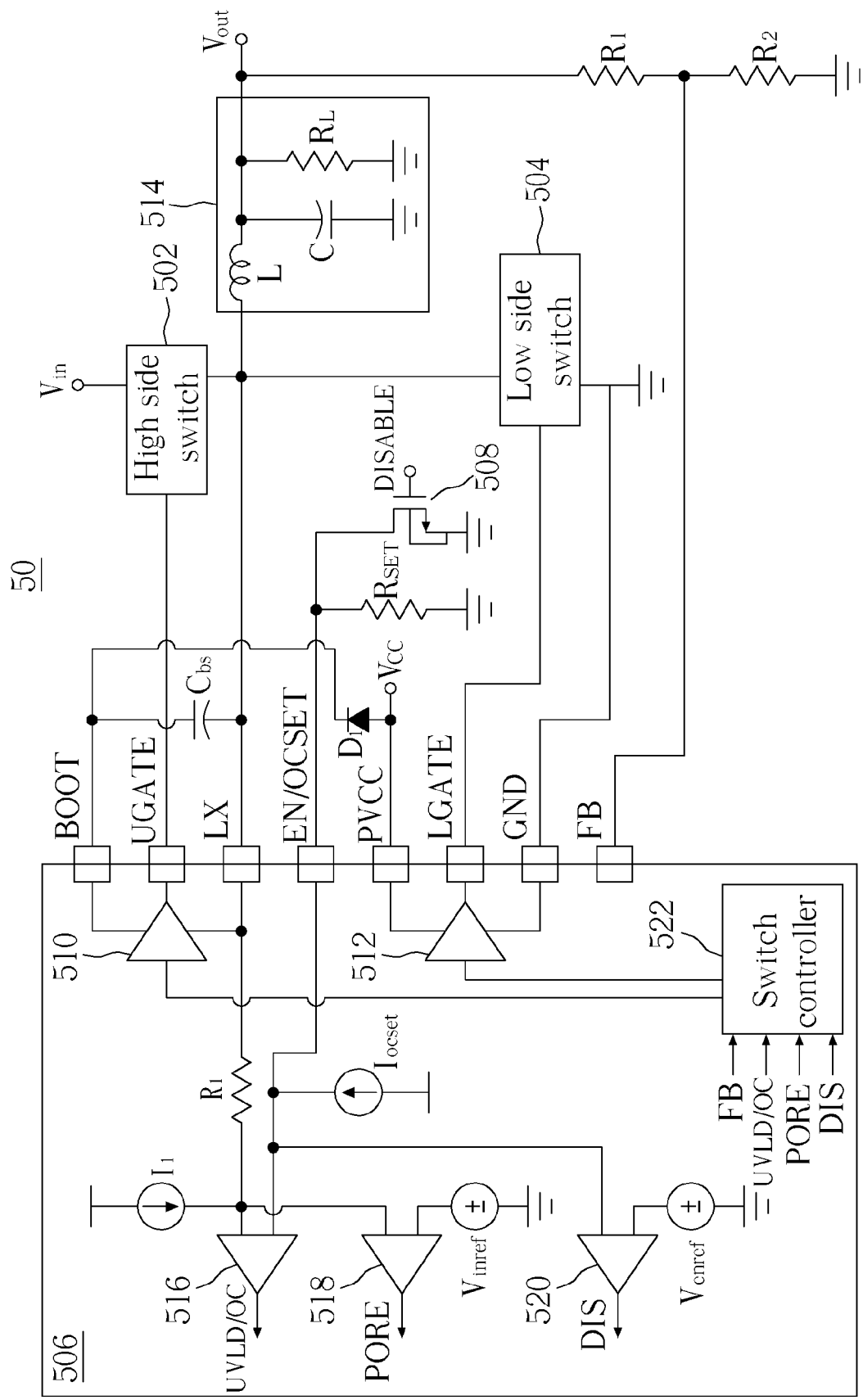
FIG. 5 shows a hint diagram of exactly eight pins.

In a preferred embodiment of the present invention, the PWM controller is packaged with exactly eight pins. FIG. 5 shows a corresponding hint diagram. These eight pins are BOOT pin, high side switch control pin (UGATE pin), phase pin (LX pin), power pin (PVCC pin), low side switch control pin (LGATE), ground pin (PGND pin), enable pin (EN/OCSET pin) and a feedback pin (FB pin). The BOOT pin, UGATE pin, and LX pin are relevant to the control of the high side switch 502, while the PVCC pin, LGATE pin and PGND pin are relevant to the control of the low side switch 504. The EN/OCSET pin provides the electrical connection for the functions of enable/over-current setting, and is coupled to an over-current setting resistor $R_{SET}$ and an enable control switch 508. In one embodiment of the present invention, the enable control switch is implemented by an open-drain transistor. When the enable control switch 508 is turned on, that is, the DISABLE node is in logic high, the voltage $V_{EN}$ of the EN/OCSET pin is grounded. When the enable control switch 508 is turned off, that is, the DISABLE node is in logic low, the voltage $V_{EN}$ of the EN/OCSET pin is equal to product of the current of the current source $I_{OCSET}$ multiplied by the resistance of the over-current setting resistor $R_{SET}$. The BOOT pin is coupled to a first power through a capacitor $C_{bs}$ and a diode $D_1$ for providing a high side supply voltage $V_{CC}$ for the buffer 510. The LX pin is connected to the low side supply voltage of the buffer 510. The output of the buffer 510 is connected to the UGATE pin for controlling the high side switch 502. The PVCC pin is connected to the first power $V_{CC}$ for providing high side supply voltage of the buffer 512. The PGND pin is connected to the low side supply voltage of the buffer 512, and the output of the buffer 512 is connected to LGATE pin for controlling the low side switch 504. The output voltage $V_{out}$ of the output stage 514 feeds back to the FB pin after the voltage is divided by resistors $R_1$ and $R_2$. The lock and protection circuit, power-sensing circuit and enable detecting circuit can be implemented by three comparators 516, 518 and 520. The first comparator 516 compares the first potential, which is a level shift derived from the voltage of the LX pin, with the voltage of the EN/OCSET pin. The level shift $V_1$ is determined by the current $I_1$ of the first current source and the first resistor $R_1$. The second input of the comparator 516 is coupled to the EN/OCSET pin. When the enable control switch 508 is turned off, the voltage of the EN/OCSET pin is $I_{OCSET} \times R_{SET}$. If the first potential is smaller than the voltage of the EN/OCSET pin, the comparator 516 sends out a UVLO/OC signal to stop the operation of the PWM controller. The first input end of the comparator 518 is coupled to a first input end of the comparator 516, and the second input end of the comparator 518 is coupled to a voltage sensing reference voltage $V_{inref}$. When the voltage of the first input end of the comparator 518 is greater than the voltage sensing reference voltage $V_{inref}$, the comparator 518 generates a voltage sensing signal PORE to indicate that the PWM controller 506 has received the necessary power. The first input end of the comparator 520 is coupled to the second input end of the comparator 516, and its second input end is coupled to an enable reference voltage $V_{enref}$. When the DISABLE signal is set to a low logic level, the enable control circuit 508 is activated. Meanwhile, the voltage of the first input of the comparator 520 is approximately ground potential, and the disable signal DIS will be sent out. When the DISABLE is set at a high logic level, the enable control circuit 508 is deactivated. Meanwhile, the voltage of the first input of the comparator 520 is approximately $I_{OCSET} \times R_{SET}$, and the delivery of the disable signal DIS is stopped. The output stage 514 includes a low-pass filter composed of capacitor C and an inductor L, and a load circuit $R_L$. The output voltage feeds back to the FB pin of the PWM controller 506 after voltage dividing by resistors $R_1$ and $R_2$. The PWM controller 506 further comprises a switch controller 522, which controls the action of the buffers 510 and 512 by reference to the disable signal DIS, the power-sensing signal PORE, the lock/protection signal UVLO/OC and the signal at FB pin, such that the voltages at the UGATE and LGATE pins are suitably adjusted to control the on/off states of the high side switch 502 and low side switch 504.

In one embodiment of the present invention, the over-current threshold $I_{OCSET}$ can be adjusted by reference to the over-current setting resistor $R_{SET}$, as represented by the following formula:

$$I_1 \times R_1 - R_{DS(ON)} \times I_{OCSET} = I_{OCSET} \times R_{SET} \quad (1)$$

$$R_{SET} = \frac{I_1 \times R_1}{I_{OCSET}} - R_{DS(ON)} \quad (2)$$

where $R_{DS(on)}$ represents an equivalent resistance when the low side switch is on, and $I_1, R_1, I_{OCSET}, R_{DS(on)}$ are regarded as constants. Therefore, the present PWM controller can adjust over-current threshold by reference to different high, low side switches or load circuits.

In one embodiment of the present invention, the PWM controller is packaged with exactly eight pins, and features disable/enable, under-voltage lockout, over-current protection and power sensing functions. In contrast to ten pins or more used in prior PWM controllers, the present invention saves a significant amount of material cost. In addition, because the over-current threshold can be adjusted by changing the resistance of the over-current setting resistor, the present invention possesses the advantage of high flexibility to adapt to different high, low side switches and load circuits.

The above-described embodiments of the present invention are intended to be illustrative only. Numerous alternative embodiments may be devised by persons skilled in the art without departing from the scope of the following claims.

What is claimed is:

1. A pulse width modulation (PWM) controller for controlling a switching voltage regulator, the PWM controller comprising:
   a first comparator configured to detect voltages of a first node and a second node so as to determine when to stop the PWM controller, wherein the PWM controller is stopped if a first potential is lower than a threshold, and the first potential derives from the voltage of the first node by a level shift of a first voltage difference;
   a second comparator configured to detect the voltage of the first node and then to compare the voltage with a power reference voltage so as to determine whether the PWM controller receives a necessary amount of power; and
   a third comparator configured to compare the voltage of the second node with an enable reference voltage so as to determine when to disable the PWN controller.

2. The PWM controller of claim 1, wherein a first input of the first comparator is coupled to a first current source and the first node through a first resistor to generate the first voltage difference, and a second input of the first comparator is coupled to the second node.

3. The PWM controller of claim 2, wherein the switching voltage regulator further comprises an over-current setting resistor, one end of the over-current setting resistor is connected to the second node, and the other end of the over-current setting resistor is grounded.

4. The PWM controller of claim 2, wherein a first input of the second comparator is coupled to the first current source and the first node through the first resistor, and a second input of the second comparator is coupled to a power reference voltage.

5. The PWM controller of claim 1, wherein the switching voltage regulator further comprises a high side switch and a low side switch connected with each other.

6. The PWM controller of claim 1, wherein the switching voltage regulator further comprises an enable control switch connected to the second node, and the PWM controller is deactivated if the enable control switch is turned off.

7. A method for controlling a pulse width modulation (PWM) controller applied to a switching voltage regulator, the method comprising the steps of:
   capturing the voltages of a first node and a second node of a PWM controller;
   setting a first potential, wherein the first potential is a level shift derived from the voltage of the first node;
   stopping the operation of the PWM controller if the first potential is lower than the voltage of the second node;
   determining that the PWM controller has received necessary power if the first potential is higher than a power reference voltage; and
   disabling the PWM controller if the voltage of the second node is lower than an enable reference voltage.

8. The method of claim 7, further comprising the step of coupling an enable control switch to the second node, wherein the PWM controller is deactivated if the enable control switch is turned off.

9. The method of claim 7, wherein the level shift is determined by a first current and a first resistor.

10. The method of claim 7, further comprising the step of coupling an over-current setting resistor and a second current source to the second node, wherein the other end of the over-current setting resistor is grounded, and the voltage of the second node is determined by the second current source and the over-current setting resistor.

* * * * *